Dec. 2, 1924.                                                    1,517,403
                         J. W. COURTNER
                              RIM
                       Filed March 31, 1924

Inventor
J. W. Courtner
By Richard B. Owen,
Attorney

Witnesses

Patented Dec. 2, 1924.

1,517,403

UNITED STATES PATENT OFFICE.

JOHN W. COURTNER, OF DEWEY, OKLAHOMA.

RIM.

Application filed March 31, 1924. Serial No. 703,263.

*To all whom it may concern:*

Be it known that I, JOHN W. COURTNER, a citizen of the United States, residing at Dewey, in the county of Washington and State of Oklahoma, have invented certain new and useful Improvements in Rims, of which the following is a specification.

The present invention relates to a rim and has for its principal object to improve upon split rims by providing means for holding the ends thereof efficiently secured together so that they may be readily separated when desired.

With the above and numerous other objects in view as will appear as the description progresses, the invention resides in certain novel features of construction, and in the combination and arrangement of parts as will be hereinafter more fully described and claimed.

Figure 1:
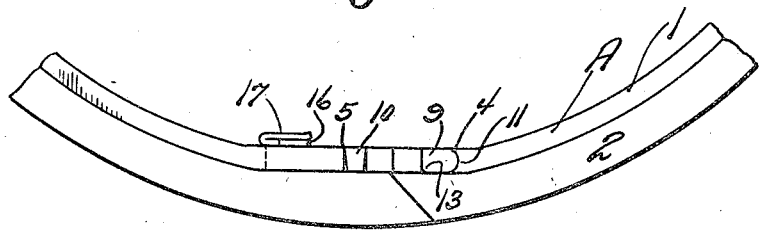
Figure 1 is a fragmentary elevation of a rim embodying my invention.
Figure 2:
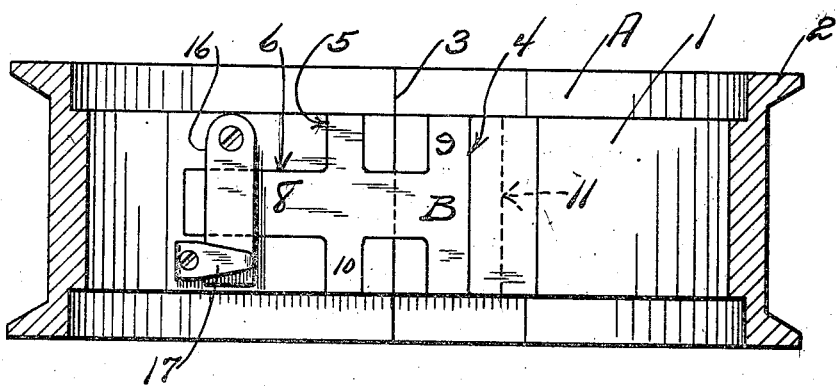
Figure 2 is a plan view of a portion of the interior thereof.
Figure 3:
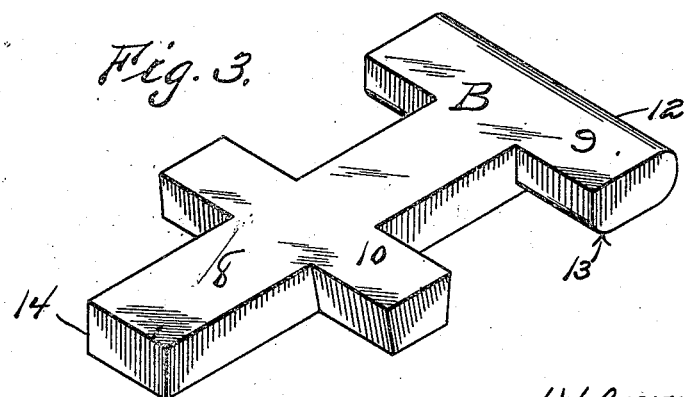
Figure 3 is a perspective view of the locking member used with the rim.

Referring to the drawing in detail it will be seen that A designates a rim having a thickened body portion 1 and the usual side flanges 2. This rim is split as at 3 in order that a tire may be easily placed thereon or removed therefrom when the rim is contracted. A pair of transversely extending grooves 4 and 5 are provided in the body 1, one on each side of the split 3. A longitudinally extending groove 6 is provided in the body connecting the two transverse grooves and extending a distance beyond groove 5. A locking member B is adapted to be seated in the grooves 4, 5 and 6. This locking member includes the elongated body 8 adapted to be received in groove 6, the end cross member 9 adapted to be received in groove 4 and the intermediate cross member 10 adapted to be received in groove 5. One side wall of the groove 4 is curved as indicated at 11 in Figure 1 and the corresponding edge 12 of the cross member 9 is also curved to fit therein. The edge 13 of this cross member 9 is slightly curved and thus the locking member may be pivoted that is the end 14 may be moved in an arc of a circle so as to lift the body 8 and cross member 10 out of their respective grooves 5 and 6. The cross member 10 tapers from one face to the other as is indicated in Figure 3 and also in Figure 1 so that the locking member may readily pivot in and out of the groove 5.

A pivoted latch 16 is movable over the body 8 of the locking member B so as to hold it in the grooves 4, 5 and 6, said latch engaging the clip 17 preferably formed of spring metal or the like for frictionally bearing against the pivoted latch when it is disposed transversely of the rim.

It is thought that the construction and operation of this rim will now be clearly understood without any more detail description thereof. It is desired, however, to point out the numerous changes in the details of construction, and in the combination and arrangement of parts as will be resorted to without departing from the spirit or scope of the invention as hereinafter claimed or sacrificing any of its advantages.

Having thus described my invention, what I claim as new is:

1. A split rim of the class described provided with a longitudinally extending groove across the split of the rim, a pair of transversely extending grooves one crossing the end of the longitudinally extending groove and the other crossing the intermediate portion of the longitudinally extending groove, a locking member including an elongated body adapted to be received in the longitudinally extending groove, and an end cross member adapted to be received in the transverse groove at the end of the longitudinal groove and an intermediate cross member adapted to be received in the transverse groove extending across the intermediate portion of the longitudinal groove, the edge of the end cross member being rounded, and one wall of the transverse groove at the end of the longitudinal groove being rounded, and means for holding the end of the elongated body opposite to that on which is disposed the end cross member in engagement with the rim.

2. A split rim of the class described provided with a longitudinally extending groove extending across the split of the rim, an end transversely extending groove disposed at the end of the longitudinally extending groove and an intermediately disposed transversely extending groove crossing the longitudinally extending groove at an intermediate portion thereof, said transversely extending grooves being disposed one on each side of the split, a locking member including an elongated body, an end cross member at one end adapted to be disposed in the end transversely extending groove and an intermediate cross member adapted to be disposed in the intermediate transversely extending groove, one edge of the end cross member being rounded and the corresponding wall of the end groove also being rounded whereby the other end of the elongated body may be swung out of the longitudinal extending groove the rounded edge and rounded side wall acting as a fulcrum, and a pivoted latch for holding the other end of the elongated body just mentioned in the longitudinally extending groove, and a spring finger mounted on the rim to extend over the latch.

3. A rim of the class described of the split variety having its interior periphery provided with a longitudinally extending groove crossing the split, one end wall of the groove being rounded, a locking member having an elongated construction with one end rounded adapted to be received in the longitudinally extending groove with its rounded end in engagement with the rounded wall of the groove, and means on the interior periphery of the rim for extending over the other end of the locking member.

In testimony whereof I affix my signature in presence of two witnesses.

JOHN W. COURTNER.

Witnesses:
ANNA COURTNER,
J. HENDON McCRARY.